United States Patent
Vermeulen et al.

(10) Patent No.: US 12,289,170 B2
(45) Date of Patent: Apr. 29, 2025

(54) NETWORK DEVICE, COMMUNICATION SYSTEM AND METHOD FOR THE NETWORK DEVICE

(71) Applicant: NXP B.V., Eindhoven (NL)

(72) Inventors: Hubertus Gerardus Hendrikus Vermeulen, Eindhoven (NL); Lu Lu Chan, Veldhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 18/478,786

(22) Filed: Sep. 29, 2023

(65) Prior Publication Data

US 2024/0121036 A1 Apr. 11, 2024

(30) Foreign Application Priority Data

Oct. 11, 2022 (EP) .................................... 22200735

(51) Int. Cl.
*H04L 1/1867* (2023.01)
(52) U.S. Cl.
CPC .................................... *H04L 1/189* (2013.01)
(58) Field of Classification Search
CPC ... H04L 1/189; H04L 2001/0094; H04L 1/08; H04L 1/22; H04L 45/28; H04L 12/40182; H04L 45/22; H04L 45/247; H04L 2012/40215
USPC ...................................................... 714/748
See application file for complete search history.

(56) References Cited

U.S. PATENT DOCUMENTS

| | | | |
|---|---|---|---|
| 7,188,292 B2* | 3/2007 | Cordina | H04L 1/18 710/33 |
| 2006/0067208 A1* | 3/2006 | Hoga | G06F 11/2005 370/216 |
| 2015/0026542 A1* | 1/2015 | Brennum | H04L 65/764 714/776 |
| 2018/0115396 A1* | 4/2018 | Herr | H04L 12/40176 |

(Continued)

FOREIGN PATENT DOCUMENTS

| | | |
|---|---|---|
| EP | 1657888 A1 | 5/2006 |
| EP | 2889772 A1 | 7/2015 |
| EP | 3148154 A1 | 3/2017 |

OTHER PUBLICATIONS

IEEE Std. 802.1CB Standard for Local and Metropolitan Area Networks—"Frame Replication and Elimination for Reliability", LAN/MAN Standards Committee, 102 pages, Sep. 28, 2017.

(Continued)

*Primary Examiner* — James C Kerveros

(57) ABSTRACT

This disclosure relates to a network device comprising: a first input interface, a first output interface, and a second output interface, wherein the network device is configured to change from a first state, referred to as a time state, to a second state, referred to as a spatial state, and vice versa, wherein the network device is configured to generate each of a first output message and a second output message based on a first input message, wherein the network device is configured to transmit, in the time state, both, the first output message and the second output message, offset in time either via the first output interface or second output interface, and wherein the network device is configured to transmit, in the spatial state, the first output message via the first output interface and the second output message via the second output interface.

19 Claims, 7 Drawing Sheets

(56) References Cited

U.S. PATENT DOCUMENTS

2018/0262298 A1\* 9/2018 Heer .................... H04L 1/08
2018/0351702 A1 12/2018 Heer
2023/0208753 A1\* 6/2023 Yamagata ............... H04L 45/22
370/392

OTHER PUBLICATIONS

Kostrzewa et al.; "Towards Safety in Automotive Ethernet-based Networks with Dynamic Workloads", 2020 IEEE 6th World Forum on Internet of Things (WF-IoT), New Orleans, LA, USA, 2020, pp. 1-6.
Lin et al.; "Automatic Repeat Request Error Control Schemes", IEEE Communications Magazine, vol. 22, No. 12, p. 5-14, Dec. 1984.
Tanenbaum, Andrew S.; "Computer Networks", Prentice Hall, 4th Edition, p. 190-194, Jan. 1, 2002.
www.wireshark.org.

\* cited by examiner

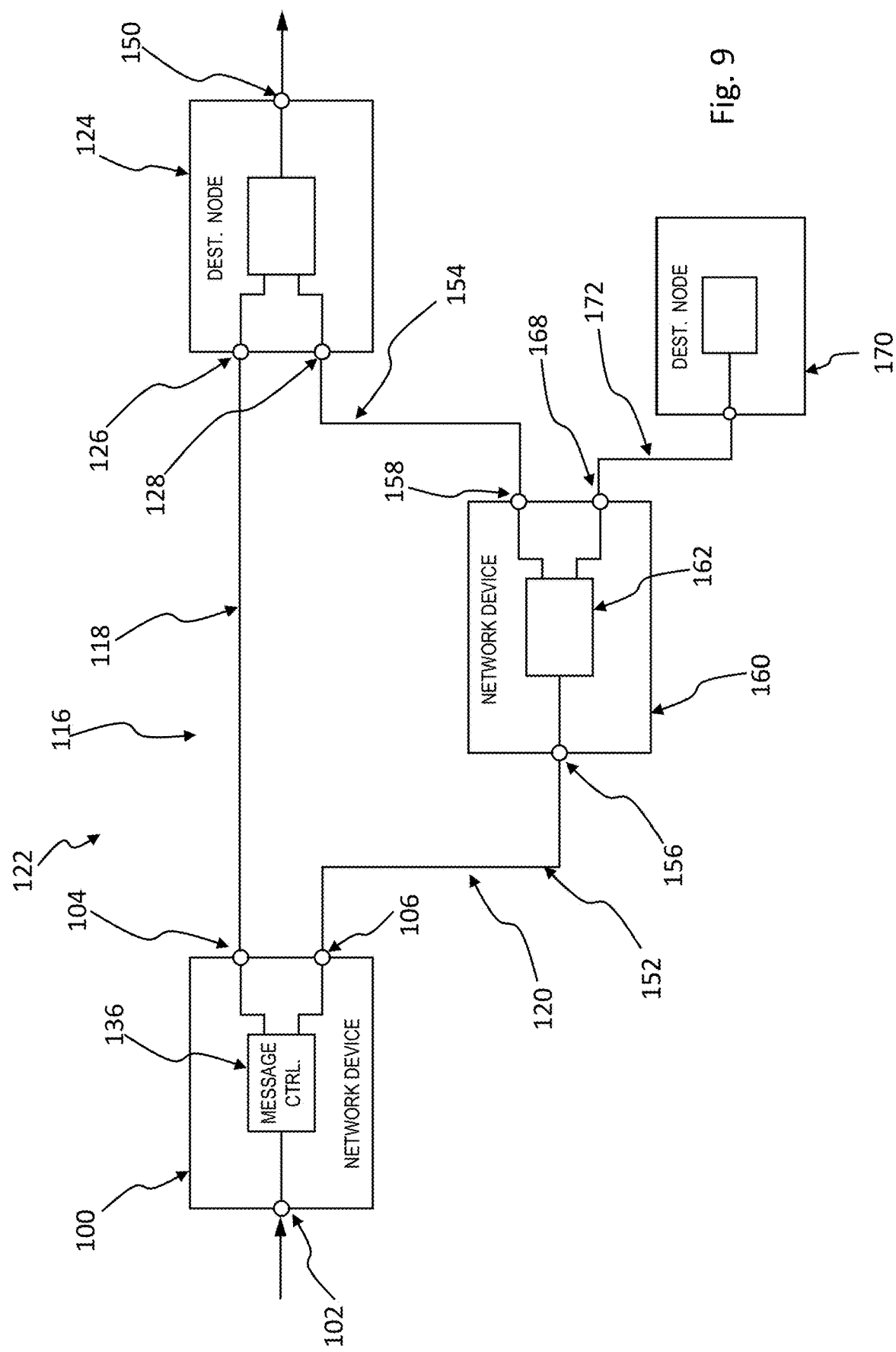

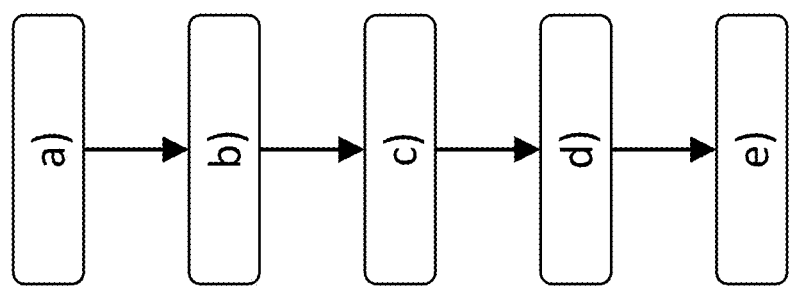

NETWORK DEVICE, COMMUNICATION SYSTEM AND METHOD FOR THE NETWORK DEVICE

CROSS-REFERENCE TO RELATED APPLICATIONS

This application claims priority under 35 U.S.C. § 119 to European patent application no. 22200735.3, filed Oct. 11, 2022, the contents of which are incorporated by reference herein.

TECHNICAL FIELD

The present disclosure relates to a network device, a communication system and a method for the network device.

BACKGROUND

Communication systems may be subject to a single-point fault at a communication link between network devices of the communication system. The fault at the communication link may be temporarily or permanently. The fault at the communication link may cause an exchange of corrupted messages via the faulty communication link. Redundancy may be used to prevent the use of corrupted messages at the receiving network device.

Temporal communication redundancy involves communicating the same message multiple times over a communication link in a sequential fashion. If a fault affects the communication link only temporarily, at least one transmission very likely reaches its destination network device without corruption. A disadvantage of temporal communication redundancy is that it does not protect a system against permanent communication link faults.

Spatial communication redundancy involves communicating the same message across two or more independent (disjoint) communication links from a source network device to a destination network device. Using two completely disjoint communication links very likely prevents a single-point fault in one of the communication links from disrupting the message communication between the network devices. A disadvantage of spatial communication redundancy is the cost involved for providing the disjoint communication links.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Aspects of the disclosure are defined in the accompanying claims.

In accordance with a first aspect of the present disclosure, a network device is provided. The network device comprises a first input interface, a first output interface, and a second output interface, wherein the network device is configured to change from a first state, referred to as a time state, to a second state, referred to as a spatial state, and vice versa, wherein the network device is configured to generate each of a first output message and a second output message based on a first input message, wherein the network device is configured to transmit, in the time state, both, the first output message and the second output message, offset in time either via the first output interface or second output interface, and wherein the network device is configured to transmit, in the spatial state, the first output message via the first output interface and the second output message via the second output interface.

In one or more embodiments, the network device is configured to receive the first input message via the first input interface.

In one or more embodiments, the network device is configured to receive the first input message and another second input message via the first input interface offset in time.

In one or more embodiments, the network device comprises a second input interface, and wherein the network device is configured to receive a second input message via the second input interface.

In one or more embodiments, the network device is configured to detect whether the first input message is error free, wherein the network device is configured to detect whether the second input message includes an indication to be a duplicate of the first input message, wherein the network device is configured, if the first input message is error free and the second input message is indicated to be a duplicate of the first input message, to discard the second input message.

In one or more embodiments, the network device is configured to generate each of the first output message and the second output message based on the first input message only if both, the first input message is error free and the second input message is indicated to be a duplicate of the first input message, wherein the network device is configured to generate each of the first output message and the second output message based on the second input message, if both, the first input message is erroneous and second input message is indicated to be a duplicate of the first input message.

In one or more embodiments, the network device is configured to detect whether the second input message is error free, and wherein the network device is configured to generate each of the first output message and the second output message based on the second input message only if, in addition, the second input message is error free.

In one or more embodiments of the network device, the first input message is temporally prior to the second input message.

In one or more embodiments of the network device, the first input message comprises a first identifier and the second input message comprises a second identifier, wherein the network device is configured to detect, based the first and second identifiers, whether the second identifier indicates the second input message to be a duplicate of the first input message.

In one or more embodiments, the network device is configured to detect and/or determine a destination node for the input message, wherein the network device is configured to analyze a communication network, that can be connected to the first output interface or to both, the first and second output interfaces, such that the communication network would extend from the at least one output interface of the network device to the destination node, wherein the network device is configured, if the communication network being connected to the at least one output node, to detect whether a first communication path of the communication network extends from the first output interface to the destination node and whether a second communication path of the communication network extends from the second output interface to the destination node, wherein the network device is configured to change to or remain in the spatial state, if both, the first and second communication paths are detected, and wherein the network device is configured to change to or remain in the time state, if only one of the first and second communication paths is detected.

In one or more embodiments of the network device, network topology data is stored by the network device, wherein the network topology data representing a plurality of communication paths of a communication network, that can be connected to the first output interface or to both, the first and second output interfaces, wherein the network device is configured to determine, based on a predefined destination node being connected to the communication network and the network topology data, whether a first communication path of the communication network extends from the first output interface to the destination node and whether a second communication path of the communication network extends from the second output interface to the destination node are provided by the communication network when being connected to the network device at the first output interface or to both, the first and second output interfaces, wherein the network device is configured to change to or remain in the spatial state, if both, the first and second communication paths are determined to be provided when the communication network being connected to the network device, and wherein the network device is configured to change to or remain in the time state, if only one of the first and second communication paths is determined to be provided when the communication network being connected to the network device.

In one or more embodiments, the network device is configured to detect or determine the first and second communication paths such that the first and second communication paths form parallel communication paths.

In one or more embodiments, the network device is configured to detect and/or determine the first and second communication paths such that message transmission over the first and second communication paths can be performed using different communication protocols.

According to a second aspect of the present disclosure, a communication system is provided. The communication system comprises a first network device. The network device is preferably according to the first aspect of the present disclosure and/or according to any of the preceding embodiments. The communication system also comprises a second network device, and a communication network with a plurality of communication paths, wherein the second network device comprises a first receiving interface and a second receiving interface, wherein a first communication path of the communication network extends from the first output interface of the first network device to the first receiving interface of the second network device, preferably wherein a second communication path of the communication network extends from the second output interface of the first network device to the second receiving interface of the second network device, wherein the second network device is configured to receive either both, a first receiving message and a second receiving message, offset in time either via the first receiving interface or second receiving interface, or, alternatively, the first receiving message via the first receiving interface and the second receiving message via the second receiving interface, wherein the second network device is configured to detect whether the second receiving message includes an indication to be a duplicate of the first receiving message, and wherein the second network device is configured, if the first receiving message is error free and the second receiving message is indicated to be a duplicate of the first receiving message, to discard the second receiving message.

According to a third aspect of the present disclosure, a method for a network device is provided, wherein the network device comprising a first input interface, a first output interface, and a second output interface, wherein the network device is configured to change from a first state, referred to as a time state, to a second state, referred to as a spatial state, and vice versa, and wherein the method comprising the steps: a) Receiving a first input message via the first input interface; b) Generating each of a first output message and a second output message based on the first input message; c) Changing the network device from the time state to the spatial state, or vice versa; d) Transmitting, if the network device changed to the time state in step c), both, the first output message and the second output message, offset in time either via the first output interface or second output interface; and e) Transmitting, if the network device changed to the spatial state in step c), the first output message via the first output interface and the second output message via the second output interface.

In accordance with a fourth aspect of the present disclosure, a computer program is provided, comprising executable instructions which, when executed by a processing unit of the network device, cause the processing unit being configured to carry out the method of the third aspect.

DESCRIPTION OF DRAWINGS

Embodiments of the present disclosure will be described in more detail with reference to the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

FIGS. 7 to 9 show simplified block diagrams of communication systems.

FIG. 10 shows a simplified flow chart of a method.

DESCRIPTION OF EMBODIMENTS

It has already been explained in the introduction to this disclosure that a faulty communication link between a first network device and a second network device may cause a message originally sent by the first network device to be corrupted by the faulty communication link, with the result that a corrupted message is received by the second network device.

With spatial communication redundancy, there are preferably multiple independent communication links between the first network device and the second network device such that the original message and a copy of the original message can each be sent from the first network device to the second network device via different communication links. Spatial redundancy therefore requires multiple communication links, which incur high product costs. In addition, there is a considerable amount of planning involved in selecting the adequate first network device and the adequate second network device.

For temporal communication redundancy, a single communication link between the first network device and the second network device may be sufficient. Therefore, the possible cost of the second network link between the two network devices may be saved. However, the cost of the second network link can only be saved if the first network device and the second network device each support temporal communication redundancy. Further, there must be spent a considerable planning effort in selecting an adequate first network device and an adequate second network devices to provide the temporal communication redundancy in a communication system.

It has been found that the costs caused by the planning effort for a communication system supporting redundancy can be significantly reduced if at least the first network device(s) of the communication system would be suitable to selectively support both, the spatial communication redundancy and the temporal communication redundancy. Such a network device is disclosed in the present disclosure.

Figure 1:
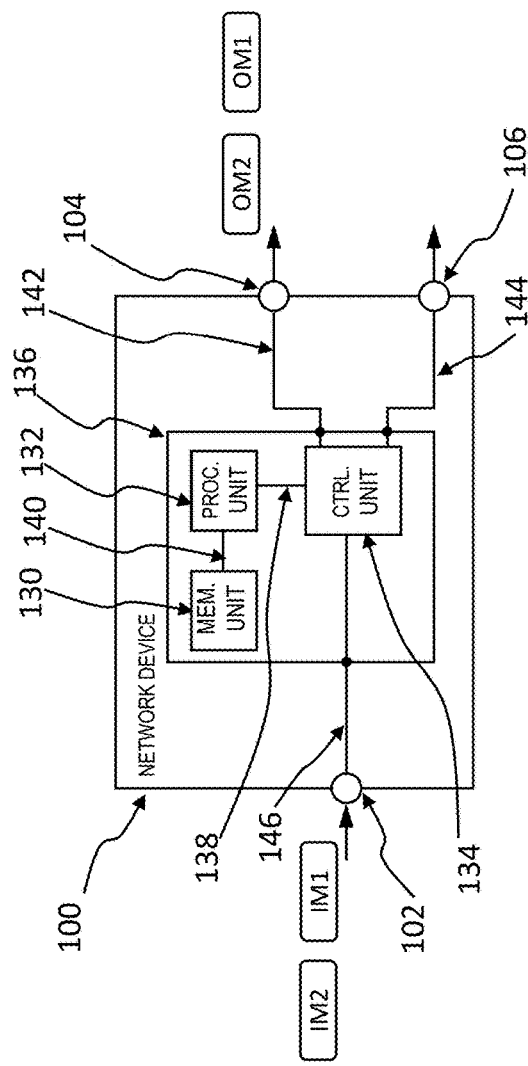
FIGS. 1 to 4 show simplified block diagrams of network devices.
Figure 2:
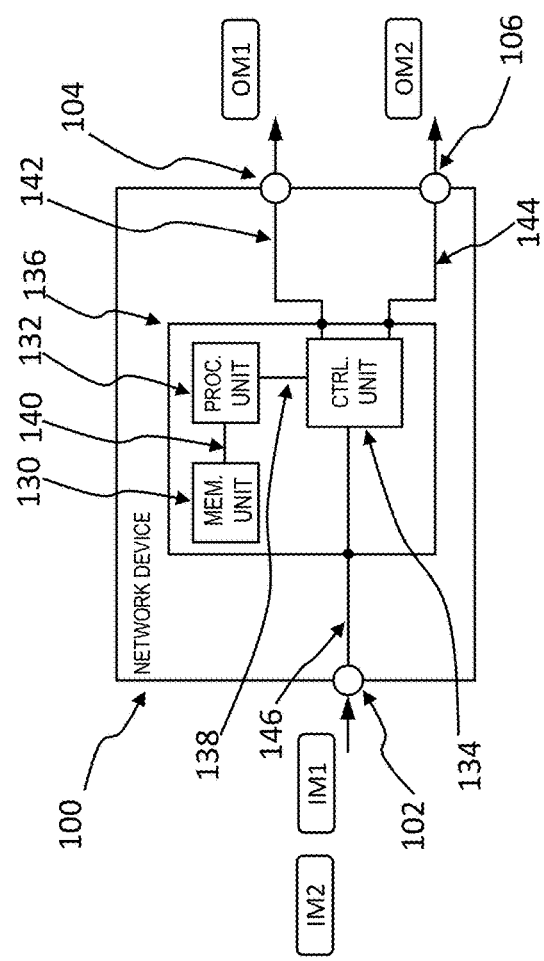
Figure 7:
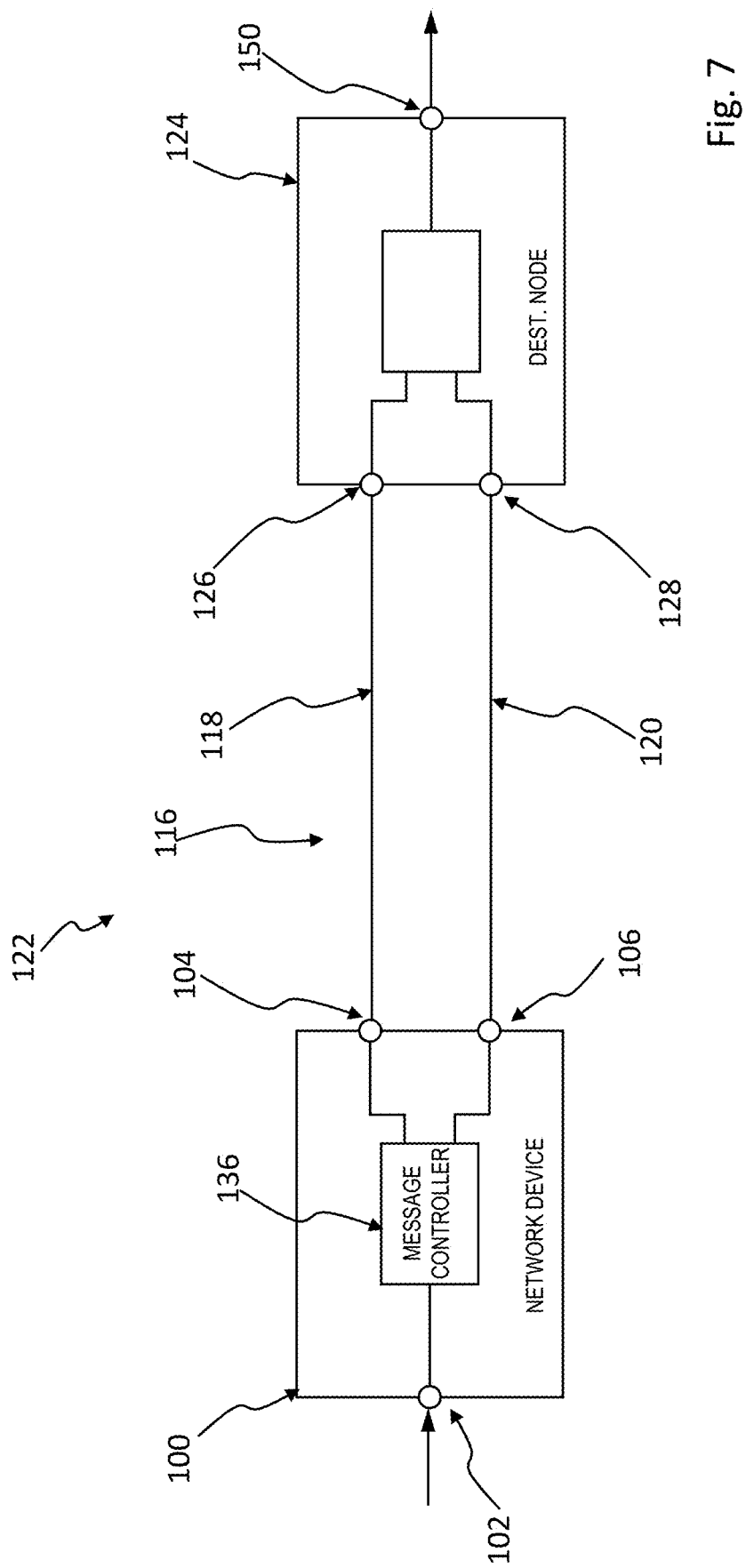
Figure 8:
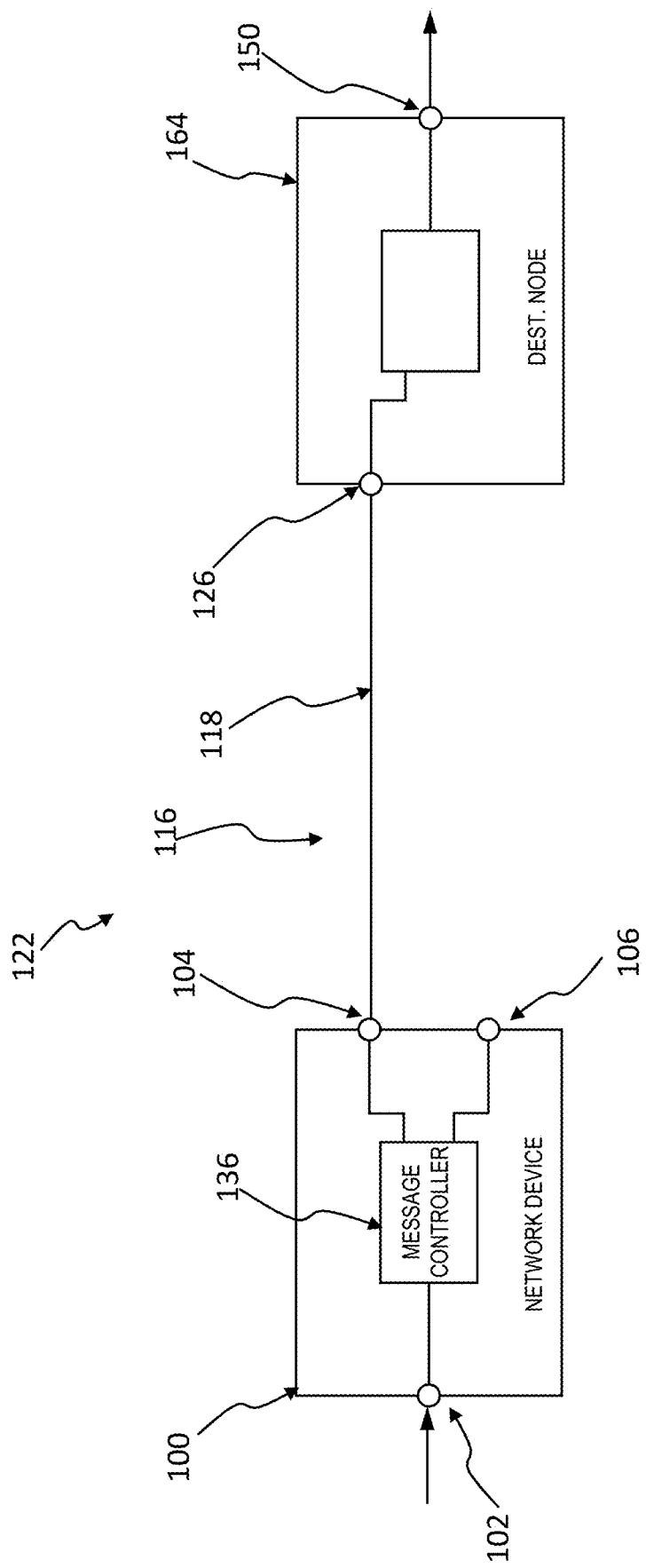

FIGS. 1 and 2 schematically illustrate examples of an embodiment of a network device 100 according to the present disclosure. In the example of FIG. 1, the network device 100 is used for temporal redundancy. This network device 100 of FIG. 1 may be used to set up a communication system 122 as schematically shown in FIG. 8, where the communication system 122 is configured to support temporal redundancy in the communication between the first network device 100 and another network device 164. On the other hand, in the example of FIG. 2, the network device 100 is used for spatial redundancy. This network device 100 of FIG. 2 may be used to set up a communication system 122 as schematically shown in FIG. 7, where the communication system 122 is configured to support spatial redundancy in the communication between the first network device 100 and another network device 124.

The network device 100 from FIGS. 1 and 2 includes a first input interface 102, a first output interface 104, and a second output interface 106. The network device 100 is configured to change from a first state, referred to as a time state, to a second state, referred to as a spatial state. The network device 100 is configured to change from the spatial state to the time state. Further, the network device 100 may be configured to be controlled to change to one of the two states. The network device may be configured to receive a control signal, for example via the first input interface 102, wherein the control signal may represent the state to which the network device 100 should change. The network device 100 may also be configured to change to one of the two states based on the control signal. In another example, the state of the network device 100 may be selected and/or set up during the installation phase for the network device 100 in a communication system 122 or during a time before said installation phase. In an example, the network device 100 is configured in the time state to support communication redundancy over time. In an example, the network device 100 is configured in the spatial state to support the spatial communication redundancy.

In an example, the network device 100 may receive a first input message IM1 via the first input interface 102. The network device 100 is configured to generate a first output message OM1 and a second output message OM2, respectively, based on the first input message IM1. In an example, both output messages OM1, OM2 may represent the same content as the first input message IM1. Thus, the second output message OM2 may be a duplicate of the first output message OM1. In an example, the first output message OM1 may be generated by storing and reading of the first input message IM1 from the first network device 100, where the read out input message IM1 forms the first output message OM1. In another example, the first output message OM1 may be generated by forwarding the first input message IM1 via the first network device 100. In an example, the first output message OM1 may be a copy of the first input message IM1. The second output message OM2 may be generated by the first network device 100 in a manner analogous to the first output message OM1. In an example, the second output message OM2 may be generated by storing and reading of the first input message IM1 from the first network device 100, where the read out input message IM1 forms the second output message OM2. In another example, the second output message two may be generated by a forwarding of the first input message IM1 via the first network device 100. In an example, the second output message OM2 may be a copy of the first input message IM1.

In an example, the network device 100 may include a message controller 136 configured to store, read out, and/or forward the first input message IM1 to generate the first output message OM1 and/or the second output message OM2. Thus, the message controller 136 of the network device 100 may be used to generate the first output message OM1 and to generate the second output message OM2. In an example, the message controller 136 includes a control unit 134. The control unit 134 may be configured to receive and forward the first input message IM1 to the first output interface 104 such that a copy of the first input message IM1 is sent at the first output interface 104 as the first output message OM1. The control unit 134 may be connected to the first output interface 104 via a communication link 142. The control unit 134 may also be configured to direct the first input message IM1 to the processing unit 132. The control unit 134 may be connected to the processing unit 132 via the communication link 132. The processing unit 132 may be configured to store the first input message IM1 in a memory unit 130 of the message controller 136. In an example, the processing unit 132 may be connected to the memory unit 130 via a communication link 140. In an example, the processing unit 132 is configured to retrieve the stored input message IM1 from the memory unit 130 and direct the retrieved first input message IM1 to the control unit 134 (again). The control unit 134 may be configured to direct the (retrieved) first input message IM1 as the second output message OM2 to either the first output interface 104 or the second output interface 106. The control unit 134 may be connected to the second output interface 106 via the communication link 144.

In FIG. 1, the example of the network device 100 is schematically illustrated as a network device 100 is in the time state. In the time state, the first output message OM1 and the second output message OM2 are directed sequentially to the first output interface 104 by the control unit 134 such that the first output message OM1 and the second output message OM2 are transmitted offset in time.

In example of the network device 100 as schematically shown in FIG. 2, as the network device 100 is in the spatial state. In the spatial state, the first output message OM1 and the second output message OM2 are not directed to the same output interface 104, 106. In the spatial state, the first output message OM1 is directed to the first output interface 104 and the second output message OM2 is directed to the second output interface 106. The first output message OM1 and the second output message OM2 may be sent over the output interfaces 104, 106 at least partially in parallel in time. In principle, however, it is also possible for the network device 100 in the spatial state that the first output message OM1 and the second output message OM2 are sent offset in time.

The network device 100 is configured to transmit in the time state both the first output message OM1 and the second output message OM2 offset in time either (both output messages OM1, OM2) via the first output interface 104 or (both output messages OM1, OM2) via the second output interface 106. On the other hand, the network device 100 in the spatial state is configured to transmit the first output message OM1 via the first output interface 104 and the second output message OM2 via the second output interface 106.

By allowing the network device 100 to change from the time state to the spatial state, and vice versa from the spatial state to the time state, the network device 100 can significantly reduce a planning effort and an installation effort to set up a communication system 122 that provides a very low message transmission loss. As a purely precautionary measure, it is noted that the time state of the network device 100 and the spatial state of the network device 100 are different states of the network device 100.

If the network device 100 is to be used with a communication system 122, such as that schematically shown in FIG. 7, for example, a change to the spatial state already makes the network device 100 suitable for providing spatial communication redundancy for message transmission between the network device 100 and the other network device 124.

If the network device 100 is to be used with a communication system 122, such as that schematically shown in FIG. 8, for example, a change to the time state already makes the network device 100 suitable for providing temporal communication redundancy for message transmission between the network device 100 and the other network device 164.

Simply by requiring very little effort to change between the spatial state and the time state, it is possible to use the same first network device 100 for either the example of FIG. 7 or the example of FIG. 8.

In an example, the network device 100 is configured to receive the first input message IM1 via the first input interface 102. The network device 100 may include a signal connection 146 extending from the first input interface 102 to the message controller 136, and preferably further to the control unit 134. The first input message IM1 may therefore be directed to the message controller 136 and/or the control unit 134 via the signal connection 146.

In an example, the network device 100 is configured to receive the first input message IM1 and the further, second input message IM2 via the first input interface 102 offset in time. The network device 100, and preferably the associated message controller 136 and/or preferably the associated control unit 134, may receive the first input message and the second input message IM2 sequentially one after the other via the first input interface 102. The first input message IM1 and the second input message IM2 may be processed by the message controller 136 and/or the control unit 134 sequentially in time. In principle, either of the input messages IM1, IM2 may be used to generate the first output message OM1 and the second output message OM2 based on the respective input message IM1, IM2. As previously discussed, the network device 100 may be configured to generate the first output message OM1 and the second output message OM2 based on the first input message IM1. In principle, the network device 100 may further be configured to generate the first output message OM1 and the second output message OM2 based on the second input message IM2, for instance, if the first input message IM1 is not error free. Thus, using the second input message IM2 to generate the two output messages OM1, OM2 may be useful, for example, if the first input message IM1 is erroneous and the second input message IM2 is an error-free duplicate of the (originally error-free) first input message IM1. In this example, the second input message IM2 may replace the first input message IM1 as the basis for generating the two output messages the OM1, OM2.

Provided that two input messages IM1, IM2 are received by the network device 100 offset in time, where the input messages IM1, IM2 are not duplicates of each other, the second input message IM2 may be treated as another first input message IM1.

Figure 3:
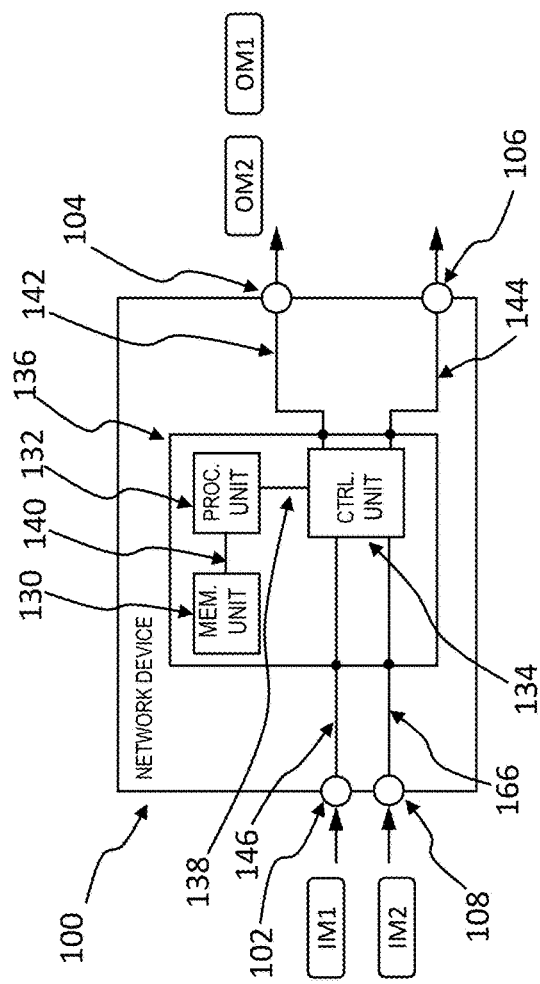
Figure 4:
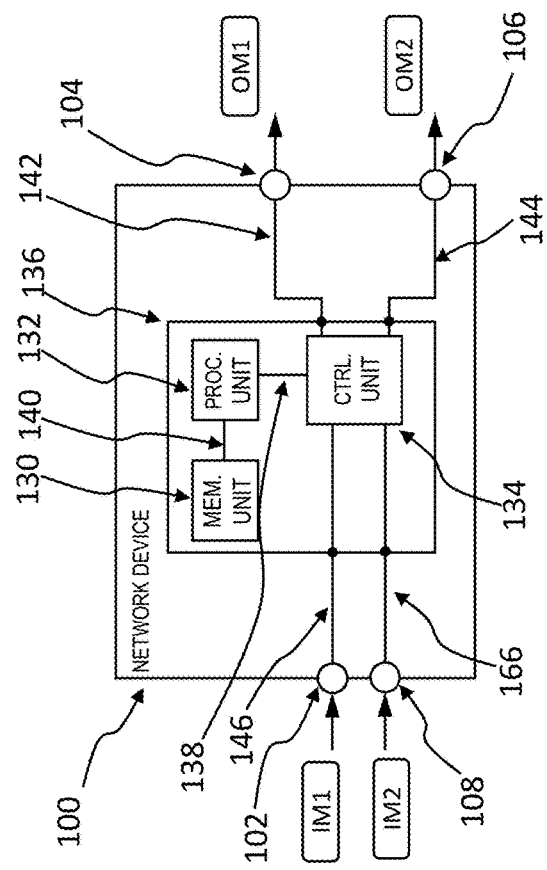

In each of FIGS. 3 and 4, examples of a further embodiment of the network device 100 are schematically illustrated. The network device 100 of FIGS. 3 and 4 is very similar to the network device 100 of FIGS. 1 and 2, so that the preceding explanations, preferred features, technical effects and advantages are referred to in an analogous manner for the network device 100 of FIGS. 3 and 4.

In an example, as schematically illustrated in FIGS. 3 and 4, the network device 100 comprises the first input interface 102 and another, second input interface 108. The network device 100 may be configured to receive the second input message IM2 via the second input interface 108. The network device may include a signal connection 166 extending from the second input interface 108 to the message controller 136, and preferably further to the control unit 134. The second input message IM2 may be directed to the message controller 136 and/or the control unit 134 via the signal connection 166. In an example, the network device 100 may be configured to receive the first input message IM1 and the second input message IM2 offset in a time, partially overlapping in time, or parallel in time. The first input message IM1 and the second input message IM2 may be processed by the message controller 136 and/or the control unit 134 sequentially in time, partially overlapping in time, or parallel in time.

In an example, the network device 100 is configured to detect whether the first input message IM1 is error-free. The network device 100 may further be configured to detect whether the second input message IM2 includes an indication that the second input message IM2 is a duplicate of the first input message IM1. The network device 100 may further be configured, if the first input message IM1 is error free and the second input message IM2 is indicated as a duplicate of the first input message IM1, to discard the second input message IM2.

Controller area network (CAN) bus is a message-based communications bus protocol that is often used within automobiles. The CAN bus protocol is used to enable communications between various electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. The data link layer of the CAN protocol is standardized as International Standards Organization (ISO) 11898-1. The standardized CAN data link layer protocol is in the process of being extended to provide higher data rates. The extended protocol, referred to as CAN Flexible Data-Rate or "CAN FD," is moving towards standardization in the form of an update of the existing ISO 11898-1 standard.

As used herein, "CAN normal mode" (also referred to as "Classical CAN mode") refers to frames that are formatted according to the ISO 11898-1 standard and "CAN FD mode" refers to frames that are formatted according to the emerging ISO/Draft International Standard (DIS) 11898-1 standard, or an equivalent thereof.

Figure 5:
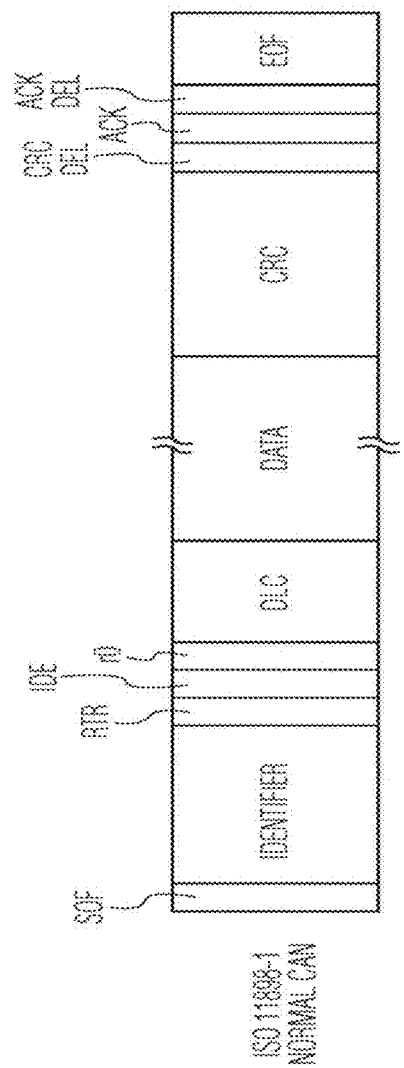
FIGS. 5 and 6 schematically show a structure of a CAN frame.
Figure 6:
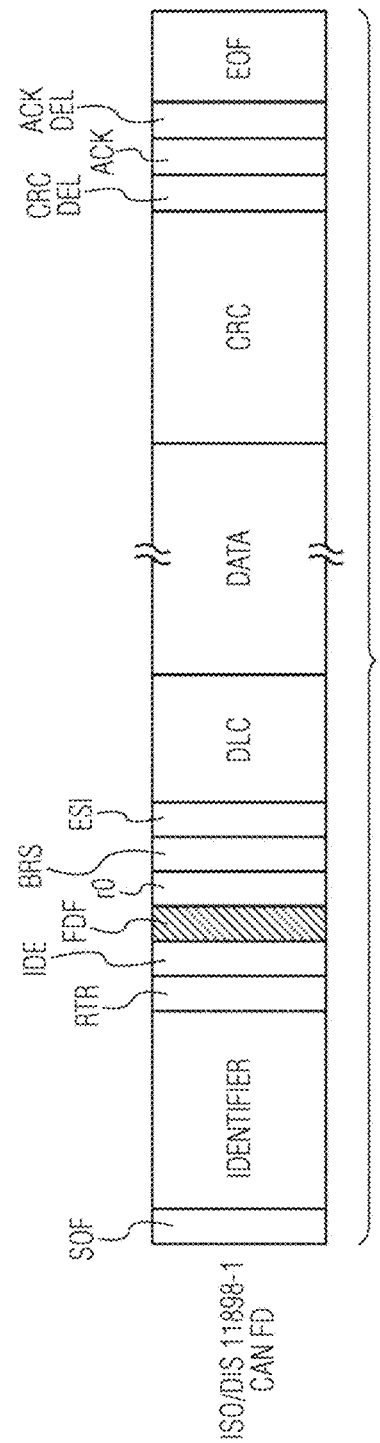

FIG. 5 depicts the format of an ISO 11898-1 frame 130 (in the classical base frame format (CBFF) or standard format) that is used in CAN normal mode and FIG. 6 depicts the format of an ISO/DIS 11898-1 frame 132 (in the FD base frame format or FBFF) that is used in CAN FD mode. The fields of the CAN normal mode and CAN FD mode frames are defined as follows:

| | |
|---|---|
| SOF | Start of Frame (always dominant) |
| IDENTIFIER | Identifier Bits |
| RTR | Remote Transmission Request |
| IDE | ID Extension |
| r0 | Reserved Bit 0 (replaced by FDF in the CAN FD format) |
| FDF | FD Format (this is the bit distinguishing the frame formats) |
| BRS | Bit Rate Switch |
| ESI | Error State Indicator |
| DLC | Data Length Code |
| Data | Data Bytes |
| CRC | Cyclic Redundancy Check |
| CRC Del | CRC Delimiter (always recessive) |
| ACK | Acknowledge |
| ACK Del | Acknowledge Delimiter |
| EOF | End Of Frame |

There is also another version of the classical frame format, referred to as "classical extended frame format (CEFF)," in which the FDF bit is in the old r1 position, whereas the FDF bit is in the r0 position in CBFF. There is also a "FD extended frame format (FEFF)," where "extended" refers to a 29-bit identifier. Of note, the CAN protocols use the reserved bit (r0 or r1) (also referred to generally as the FDF bit) within a CAN frame to identify a frame as a CAN FD mode frame. In particular, the FDF bit is a 1-bit field that indicates whether the frame is a CAN normal mode frame (ISO 11898-1) or a CAN FD mode frame (ISO/DIS 11898-1). When the FDF bit is dominant (e.g., low or "0"), the frame is a CAN normal mode frame and when the FDF bit is recessive (e.g., high or "1"), the frame is a CAN FD mode frame. In a CAN normal mode frame, the reserved bits (r0, r1) are always driven dominant to the bus lines.

CAN messages are broadcast messages and the identifier is unique to the sender CAN node. The CAN protocol controllers of the receiving CAN nodes have identifier filters that are "tuned" to certain identifiers to make sure that the host receives relevant messages and is not bothered with irrelevant messages. Standard CAN frames have an 11-bit IDENTIFIER field to carry an 11-bit identifier and extended CAN frames have a 29-bit IDENTIFIER field to carry a 29-bit identifier. The IDENTIFIER field 152 of a standard CAN frame is depicted in FIG. 4A and the IDENTIFIER field of an extended CAN frame is depicted in FIG. 4B. As shown in FIG. 4B, the 29-bit IDENTIFIER field is divided into two sections, an 11-bit base IDENTIFIER field 154 and an 18-bit extended IDENTIFIER field 156.

In an example, each of the first input message IM1, the first output message OM1 and the second output message OM2 may be in the form of a CAN message. Further, also the second input message IM2 may be in the form of a CAN message.

In an example, the network device 100 may be configured to determine a checksum for each input message IM1, IM2 based on a predefined checking rule applied to at least a portion of the bits of the respective input message IM1, IM2. In an example, an input message may have the form of a CAN message. The CAN message may be represented by a CAN frame. In this case, the network device 100 may be configured to determine a checksum via the predefined checking rule and the bits of the frame. The network device may further be configured to compare the determined checksum with a reference checksum. The reference checksum may also be represented by predefined bits of the respective input message. In the aforementioned example, the CRC field of the CAN message may represent the reference checksum. The network device 100 may be configured to determine, based on the result of the comparison, either that the input message is error-free, such as if the determined checksum matches the respective reference checksum, or that the input message is erroneous, such as if the determined checksum does not match the respective reference checksum.

In an example, where the second input message IM2 is a duplicate of the first input message IM1 and where the network device 100 determines the first input message IM1 to be error-free, it may be appropriate to discard the second input message IM2. Previously, it was explained that in an example, the network device 100 may be configured to check the first input message for possible errors by determining a checksum for the first input message IM1 based on a predefined checking rule applied to at least a part of the bits of the first input message. In an example, if the checksum corresponds to a reference checksum represented by the first input message IM1, the network device 100 will determine that the first input message IM1 is error-free. In an example, to potentially discard the second input message IM2, the network device 100 is configured to detect whether the second input message IM2 is a duplicate of the first input message. If the second input message IM2 turns out to be a duplicate of the first input message IM1, then the network device 100 preferably discards the second input message IM2.

Referring to FIGS. 5 and 6, it was explained in connection with CAN messages that each CAN message may be formed by a CAN frame comprising an IDENTIFIER field, which may also be referred to as an identification field. The network device 100 may be configured to determine whether the second input message IM2 is a duplicate of the first input message IM1 based on an identification field of the first input message IM1 and based on an identification field of the second input message IM2. If the identification fields of the two input messages IM1, IM2 are identical, the network device 100 may determine that the second input message IM2 is a duplicate of the first input message IM1. Otherwise, the network device 100 will determine that the second input message IM2 is not a duplicate of the first input message IM1. The network device 100 may therefore be configured to detect whether the second input message IM2 includes an identification field representing an indicator that indicates the second input message IM2 as a duplicate of the first input message IM1.

However, in an example, the indicator of the second input message IM2 is not limited to the indication field (or IDENTIFIER) of the second input message IM2. In an example, the indicator of the second input message IM2 may be formed from predefined parts, bits and/or fields of the second input message IM2. For example, the indicator of the second input message IM2 may comprise more than one predefined field of the second input message IM2, preferably including the respective identification field. In another example, the indicator of the second input message IM2 may be formed by all bits and/or fields of second input message IM2. In an even further example, the indicator of the second input message IM2 may comprise only predefined bits of the second input message IM2. However, if the second input message IM2 is in the form of a CAN frame, the indicator of the second input message IM2 may consist solely of the IDENTIFIER of the CAN frame. In an example, the previous explanations, advantageous features, technical effects and/or benefits mentioned in connection with the second input message IM2 may apply in an analogous manner to the first input message IM1.

In an example, if the network device 100 determines that the second input message IM2 is a duplicate of the first input message IM1 and if the network device 100 also determines that the first input message IM1 is error-free, the network device 100 may discard the second input message IM1. In this case, the network device 100 may generate each of the first output message OM1 and the second output message OM2 based on the first input message IM1, such that a communication redundancy is provided (or maintained). Discarding the second input message IM2 effectively prevents another two output messages from being generated based on the second output message OM2. These further two output messages are unnecessary in the aforementioned case, and would lead to an unnecessary load on the communication network.

However, using the first input message IM1 to generate the first output message OM1 and the second output message OM2 is only useful if the first input message IM1 is error-free. Conversely, if the network device 100 detects an error in the first input message IM1, the first output message OM1 and the second output message OM2 should not be generated based on the first input message IM1.

In an example, the network device 100 is configured to generate each of the first output message OM1 and the second output message OM2 based on the first input message IM1 only if the first input message IM1 is error-free and preferably if, also, the second input message IM2 is (or is indicated to be) a duplicate of the first input message IM1. This can effectively prevent two erroneous output messages OM1, OM2 from being generated and/or transmitted. If the second input message IM2 is or is at least indicated to be a duplicate of the first input message IM1, and if the network device 100 further determines that the second input message IM2 is error-free, it is possible for the network device 100 to use the second input message IM2 instead of the first input message IM1 as a basis to generate the first output message OM1 and the second output message OM2. In this case, the first input message IM1 may be discarded by the network device 100.

In an example, the network device 100 is configured to generate each of the first output message OM1 and the second output message OM2 based on the second input message IM2 (preferably rather than based on the first input message IM1) if both the first input message IM1 is erroneous and (if further) the second input message IM2 is (or is at least indicated to be) a duplicate of the first input message IM1. However, if possible, it should be avoided that an erroneous second input message IM2 is used as a basis to generate the two output messages OM1, OM2.

In an example, the network device 100 is configured to detect whether the second output message IM2 is error-free. Further, the network device 100 may be configured to generate each of the first output message OM1 and the second output message OM2 based on the second input message IM2 only if, in addition, the second input message IM2 is error-free. In an example, the network device 100 will use the second input message IM2 as a basis for generating the two output messages OM1, OM2 only if the following requirements are given: the first input message IM1 is erroneous, the second input message IM2 is (or is at least indicated to be) a duplicate of the first input message IM1, and the second input message IM2 is error-free. In this case, the first input message IM1 may be discarded by the network device 100 so as not to be used to generate the first output message OM1 and the second output message OM2.

In an example, the network device 100 may be configured to selectively use either the first input message IM1 or the second input message IM2 as a basis to generate both, the first output message OM1 and the second output message OM2. The network device 100 may be configured to determine the choice of the input message IM1, IM2 by which of the input messages IM1, IM2 is error free. In this regard, the network device 100 may be configured to use a (single) error-free input message IM1, IM2 as a basis for generating the two output messages OM1, OM2. The respective other input message (irrespective of whether the other input message is error free or erroneous) may be discarded by the network device 100. Selecting an error-free input message IM1, IM2 may ensure that error-free output messages OM1, OM2 are generated. By discarding the other input message in each case, an increased load on the communication network can be prevented while refreshing the redundancy on the message.

In an example, particularly if both the first input message IM1 and the second input message IM2 are received via the first input interface 102, it may be provided that the first input message IM1 temporally prior to the second input message IM2. In another example, in which the first input message is received via the first input interface and the second input message IM2 is received via the second input interface 108, it may be provided that the first input message IM1 is not or not completely temporally prior to the second input message IM2.

As previously explained with regard to examples related to FIGS. 5 and 6, it may be provided that each input message IM1, IM2 comprises an associated identification (field). The respective identification (field) may be used and/or configured to identify the respective associated input message IM1, IM2. Basically, there are different ways to identify a message. Against this background, the following explanations should not necessarily be understood as a conclusive explanation and/or enumeration. In an example, an identification of an input message IM1, IM2 may be determined by an address, in particular a MAC address, specific bits of the respective input message IM1, IM2, or specific fields of the respective input message IM1, IM2. In an example, reading out an identification from an input message IM1, IM2 may be performed without an interpretation of bits or fields of the respective input message. In other words, an identification of an input message IM1, IM2 may be read out in an example independently of the meaning of the content of the respective input message IM1, IM2.

In an example, the network device 100 is configured to receive the first input message IM1 comprising a first identifier. The network device 100 may further be configured to receive the second input message IM2 comprising a second identifier. Preferably, the network device 100 is configured to detect, based on the first identifier and the second identifier, whether the second identifier indicates that the second input message IM2 is a duplicate of the first input message IM1. Each of the two identifiers may be formed by predetermined bits and/or predetermined fields of the respective input message IM1, IM2. In an example, each of the two identifiers is represented by at least 3 bits or at least 4 bits of the respective input message IM1, IM2. This can prevent an identifier from being represented exclusively by a single bit. This can significantly reduce the risk of misidentifications. From the combination of the predefined bits and/or from the combination of the predefined fields, the respective identifier may be represented. Each identifier may include, for example, an address of a sender, an address of the receiver, the type of payload data represented by the respective input message, and/or data that provides identification of the respective input message. In an example, the second identifier may identify the same input message as the first identifier, such that from this context it may be determined via the network device 100 that the second input message IM2 having the second identifier is a duplicate of the first input message IM1 having the first identifier. In another example, the second identifier may be different from the first identifier, such that it may be determined from this relationship via the network device that the second input message IM2 is not a duplicate of the first input message IM1.

In an example, the network device 100 is configured to store the identifier of each input message IM1, IM2. The duration for which an identifier is stored by the network device 100 may be limited to a predetermined storage time. The network device 100 may be configured to read the identifier from an input message IM1, IM2 after the respective input message IM1, IM2 is received by the network device 100. The network device 100 may be configured to store the read identifier in the memory unit 130 via the processing unit 132. In an example, the identifier of the first input message IM1 may be stored in the memory unit 130, preferably for at least the predetermined storage time, after the first input message IM1 is received by the network device 100. The network device 100 may receive a plurality of input messages during the storage time, each of which is not a duplicate of the first input message IM1. The network device 100 may read out the identifier from each input message of the plurality of input messages and compare each identifier to the first identifier, such that the network device 100 determines each of the plurality of input messages is not a duplicate of the first input message IM1. In another example, the network device 100 may further receive the second input message IM2 during the storage time (subsequent to receiving the plurality of input messages). The network device 100 may read out the identifier of the second input message IM2, and compare the identifier of the second input message IM2 to the stored identifier of the first input message IM1, such that the network device determines that the second input message IM2 is a duplicate of the first input message IM1 based on the comparison result. Therefore, between the reception of the first input message IM1 and the reception of the second input message IM2, it is possible that the network device receives further input messages each of which is not a duplicate of the first input message IM1. By storing the identifier of the first input message IM1, it is possible via the network device 100 to detect a duplicate of the first input message IM1 even if the corresponding input message IM2 is not received by the network device 100 immediately temporally subsequent to the first input message IM1.

In an example, the network device 100 may be configured to delete a stored identifier of a first input message IM1 after the network device 100 determines that a second input message has been received as a duplicate by the network device 100. The memory requirement and/or storage capacity of the memory unit 130 may thus be limited. This saves costs and/or installation space.

In an example, the network device 100 is configured to receive the first input message via the first input interface 102 according to a first communication protocol. The network device 100 may further be configured to receive the second input message according to the first communication protocol via the first input interface 102 or the second input interface 108 (if the second input interface 108 is provided). In an example, the first communication protocol may be based on the CAN standard. However, it is also possible that the first communication protocol is configured according to another standard. In an example, the network device may be configured to send the first output message OM1 via the first output interface 104 according to a second communication protocol, wherein the first communication protocol and the second communication protocol are different. In an example, the second communication protocol may be based on an Ethernet standard. In another example, the network device 100 may be configured to send the second output message OM2 according to the second communication protocol either via the first output interface 104 or via the second output interface 106 (if the second output interface 106 is provided). The at least one output message OM1, OM2 may be sent via the network device 100 in a different communication protocol than the communication protocol in which the at least one input message IM1, IM2 is received.

In an example, the network device 100 may be configured to send the first output message OM1 according to the first communication protocol via the first output interface 104 and the second output message OM2 according to the second communication protocol via the second output interface 106. In another example, the network device 100 may be configured to send the first output message OM1 according to the second communication protocol via the first output interface 104 and the second output message OM2 according to the first communication protocol via the second output interface 106. Using the network device 100, it may be possible to send at least one of the two output messages OM1, OM2 according to a different communication protocol than the communication protocol of the at least one input message IM1, IM2. The use of the different communication protocol for the at least one output message OM1, OM2 provides a higher probability that at least one of the two output messages OM1, OM2 can be transmitted to a receiver without errors.

In another example, the network device 100 may be configured to transmit the second output message OM2 via the second output interface 106 according to a third communication protocol, the third communication protocol being different from the second communication protocol and/or the first communication protocol.

From the combination of FIGS. 7, 8, and 9, it can be understood that the network device 100 can be applied in different communication systems 122. For the communication system 122 of FIG. 7 and FIG. 9, the network device 100 is in the spatial state, respectively. For the communication system 122 of FIG. 8, the network device 100 is in the time state. In order to reduce the effort required to establish the different communication systems 122, it is advantageous if the network device 100 independently detects in which of the two aforementioned states the network device 100 should change or remain. In this regard, it has been shown to be advantageous if the network device 100 is configured to first analyze whether at least two communication paths 118, 120 extend from the network device 100 to a destination node, in particular in the form of a further network device 124. If at least two communication paths 118, 120 are present, the network device 100 may change to the spatial state or remain in the spatial state. However, if the analysis determines that only a single communication path 118 extends from the network device 100 to the destination node, in particular the further network device 124, the network device 100 should change to the time state or remain in the time state. Depending on the number of the at least one communication path 118, 120 between the network device 100 and the destination node, it may thus be decided by the network device 100 which communication redundancy is possible and supported by the network device 100.

In an example, each input message IM1, IM2 may represent an address. The network device 100 may be configured to read the address from the respective input message IM1, IM2. Based on the read-out address of the respective input message IM1, IM2, the network device 100 may, in an example, determine a destination node, in particular in the form of another network device 124, of a communication system 122.

In an example, the network device 100 is configured to analyze the communication network 116 that may be connected to the first output interface 104 or to both the first and second output interfaces 104, 106. The communication network 116 may extend from the at least one output interface 104, 106 of the network device 100 to the destination node 124. In the embodiment of the communication system 122 of FIG. 7, the network device 100 may be configured to analyze the communication network 116, and preferably the associated communication paths 118, 120 that couple the at least one output interface 104, 106 of the network device 100 to the destination node 124. Each of the communication paths 118, 120 may include and/or be formed by a signal connection in the form of electrical interconnect lines. As can be seen in the example shown in FIG. 9 of the communication system 122, a communication path from an output interface 106 of the network device 100 to the destination node 124 may include a plurality of signal links 152, 154 and a network component 160. The network component 160 may be configured to relay messages. The analysis performed via the network device 100 may be configured such that the analysis detects each communication path 118, 120 from the at least one output interface 104, 106 of the network device 100 via the communication network 116 to the destination node 124.

In an example, two communication paths 118, 120 are referred to if the first communication path 118 is at least partially different from the second communication path 120. In an example, a first communication path 118 and a second communication path 120 may be provided if the two communication paths 118, 120 each have at least a portion that is not shared by both communication paths 118, 120. In another example, two communication paths 118, 120 are assumed to be provided only if the two communication paths 118, 120 do not have a single shared section.

The network device 100 may be configured, if the communication network 116 is connected to the at least one output interface 104, 106, to detect whether a first communication path 118 of the communication network 116 extends from the first output interface 104 to the destination node 124 and whether a second communication path 120 of the communication network 116 extends from the second output interface 106 to the destination node 124. The network device 100 may further be configured to change to or remain in the spatial state if both the first communication path 118 and the second communication path 120 have been detected. The network device 100 may further be configured to change to the time state or remain in the time state if only one of the first and second communication paths 118, 120 are detected.

In the examples of FIGS. 7 and 9, the network device 100 will detect each of two communication paths 118, 120 extending from the two output interfaces 104, 106 of the network device 100 to the destination node 124. For the examples of FIGS. 7 and 9, the network device 100 will change to the spatial state or remain in the spatial state. In contrast, in the example of FIG. 8, the network device 100 will detect only a single communication path 118 between the first output interface 104 and the destination node, in this case in the form of the network device 164. In the example of FIG. 8, the network device 100 will change to or remain in the time state.

The foregoing explanation regarding the network device 100 illustrates the advantages, namely that the network device 100 will change to or remain in the time state if there is a single communication path 118 between the network device 100 and the destination node 164 alone (as in the example shown in FIG. 8), such that communication redundancy over time is provided due to the time state. On the other hand, if multiple communication paths 118, 120 are present between the network device 100 and the destination node 124 (as in FIGS. 7, 9), the network device 100 will change to or remain in the spatial state to provide spatial communication redundancy.

In an example, a multi-branched communication network 116 may be connected to the first output interface 104 and the second output interface 106 of the network device 100. A very simple embodiment of the multi-branched communication network 116 can be seen schematically in FIG. 9. Previously, reference was made to the further network device 124 as a destination node. This destination node may be referred to as the first destination node 124. The network device 160 may include a unit 162 that forwards a message to either output 158 or output 168. The output 158 is used so that two parallel communication paths extend from the network device 100 to the first destination node 124. Output 168 may be used to send a message from network device 100 to further network device 170, which may be designated as second destination node 170. A further signal connection 172 may extend from the output 168 to the second destination node 170. The further signal connection 172 and the network device 160 may form a part of the communication network 122.

Due to the multiple branching of the communication network 116, two different signal paths may extend to a first destination node 124 (as previously explained), whereas a single communication path, preferably via the signal connection 152, the network device 160 and the signal connection 172, may extend solely to a second destination node 170. Due to the plurality of signal links 118,152,154,172 and the at least one network device 160, a network topology of the communication network 122 is formed, which comprises a plurality of different communication paths. Provided that the network topology of the communication network 122 is known, the different communication paths of the communication network 122 may be represented and/or stored by network topology data.

In an example, the network topology data is stored by the network device 100. In an example, the network topology data may be stored by the memory unit 130 of the network device 100. The network topology data may represent a plurality of communication paths of the communication network 122 that may be or are connected to the first output interface 104 or both the first and second output interfaces 104, 106 of the communication network 100.

In an example, the network device is configured to determine whether a first communication path of the communication network 122 extends from the first output interface 104 to the destination node 124, 164 and whether a second communication path of the communication network 122 extends from the second output interface 106 to the destination node 124, 164 based on a predefined and/or network device-determined destination node 124, 164 connected to the communication network 122 and the network topology data. The communication paths may be considered to be actually provided if the communication network 122 is connected to the first output interface 104 of the network device 100 or to both the first and second output interfaces 104, 106 of the network device 100.

In an example, the network device 100 is configured to change to or remain in the spatial state, if both, the first and second communication paths 118, 120 are determined (based on the network topology data) to be provided if the communication network 116 is connected to the network device 100.

In an example, the network device 100 is configured to change to or remain in the time state, if only one of the first and second communication paths 118, 120 is determined to be provided if the communication network 116 is connected to the network device 100.

Using the network topology data provides the advantage that, without analyzing the communication network 122, it can already be determined by the network device 100 whether the network device 100 changes to the spatial state or the time state to transmit two output messages to a destination node 124, 164 based on an input message.

Based on the principles provided above, the network device 100 may be configured to detect (for example via the network analysis) or determine (based on the network topology data), whether the first and second communication paths 118, 120 form parallel communication paths 118, 120. If parallel communications paths 118, 120 are provided, the network device 100 is configured to change to the spatial state or remain in the spatial state. Otherwise, the network device 100 may be configured to change to the time state or remain in the time state. In either case, communication redundancy can still be ensured via the network device, either as spatial communication redundancy or as temporal communication redundancy.

In the examples of FIGS. 7 and 9, a communication system 122 is schematically illustrated as having two parallel communication paths 118, 120, respectively, between the network device 100 and the destination node 124. In the example shown in FIG. 9, the second communication path 120 may comprise the communication link 120, the network device 160, and the further communication link 154. The first communication path 118 and the second communication path 120 do not have a common portion in FIGS. 7 and 9. In a departure from the examples shown in FIGS. 7 and 9, it is generally possible for the communication network 116 to include further communication paths (not shown) each extending from the network device 100 to the destination node 124. These further communication paths may also be detected by the network device 100 based on the analysis of the communication network 116 and/or determined based on the network topology data. Thus, a plurality of communication paths (particularly more than two) may exist between the network device 100 and the destination node 124. In an example, the network device 100 may be configured to detect or determine the first communication path 118 and the second communication path 120 such that the first and second communication paths 118, 120 form parallel communication paths 118, 120. In other words, the network device 100 may be configured to detect or determine, given a plurality of possible communication paths, two communication paths 118, 120 forming parallel communication paths 118, 120 between the network device 100 and the destination node 124. Preferably, the network device 100 may further be configured to determine or detect the two parallel communication paths 118, 120 such that the two parallel communication paths 118, 120 do not have a common portion. Should an error occur in the message transmission over one of the two communication paths 118, 120, the error would not adversely affect the message transmission over the other communication path 118, 120.

It was previously explained that it may be possible that different communication protocols may be used for the communication paths 118, 120 between the network device 100 and the destination node 124. In an example, the communication protocol for the first communication path 118 and the communication protocol for the second communication path 120 may be different. The different communication protocols may increase the likelihood that a message can be transmitted without error from the network device 100 to the destination node 124 via at least one of the two communication paths 118, 120. In an example, the network device 100 may be configured to detect and/or determine the first communication path 118 and the second communication path 120 such that a message transmission may be performed over the first and second communication paths 118, 120 using different communication protocols. For example, the network device 100 may detect and/or determine the two communication paths 118, 120 from a plurality of possible communication paths such that the communication protocol of the first communication path 118 and the communication protocol of the second communication path 120 are different. As previously explained, this may increase the likelihood of ensuring error-free message transmission over at least one of the two communication paths 118, 120.

In connection with FIGS. 7, 8 and 9, reference has already been made to another network device 124, 164, which was also be referred to as a destination node. In the following, the further network device 124, 164 may also be referred to as the second network device 124, 164.

In an example, a communication system 122 is provided. The communication system preferably comprises the first network device 100, the second network device 124, 164 and a communication network 116. With respect to the first network device 100 and/or with respect to the second network device 124, 164, reference is made to the preceding explanations, preferred features, technical effects and/or advantages in an analogous manner as already explained for the respective network device 100, 124, 164. The communication network 116 preferably comprises a plurality of communication paths 118, 120. Referring to FIGS. 7, 8, and 9, examples of a communication network 116 have already been explained. For the communication network 116 of the communication system 122, reference is preferably made to the explanations of the preferred features, technical effects and advantages of the communication network of FIGS. 7, 8 and 9 in an analogous manner.

In an example, the second network device 124, 164 comprises a first receiving interface 126 and a second receiving interface 128. A first communication path 118 of the communication network 116 preferably extends from the first output interface 104 of the first network device 100 to the first receiving interface 126 of the second network device 124, 126. In an example, a further second communication path 120 of the communication network 116 may exists. The second communication path 120 may extend from the second output interface 106 of the first network device 100 to the second receiving interface 128 of the second network device 124, 164.

In an example, the second network device 124, 164 is configured to receive both, a first receiving message OM1 and a second receiving message OM2, offset in time either via the first receiving interface 126 or (possibly in case of the second network interface 124) second receiving interface 128. The first receiving message may be formed by the first output message OM1, which can be sent by the first network device 100. The second receiving message may be formed by the second output message OM2, which can be sent by the first network device 100. Accordingly, second network device 164 may be configured for a temporal communication redundancy. FIG. 8 schematically illustrates an example of a communication system 122 including such a second network device 164.

In another example, the second network device 124 is configured to receive the first receiving message OM1 via the first receiving interface 126 and the second receiving message OM2 via the second receiving interface 128. As explained for the previous example, the first receiving message may be formed by the first output message OM1, which can be sent by the first network device 100, and the second receiving message may be formed by the second output message OM2, which can be sent by the first network device 100. Accordingly, second network device 124 of this example may be configured for a spatial communication redundancy. Each of FIGS. 7 and 9 schematically illustrates an example of a communication system 122 including such a second network device 124.

In an example, the second network device 124, 164 is configured to detect whether the second receiving message OM2 includes an indication to be a duplicate of the first receiving message OM1. The second network device 124, 164 may comprise a processing unit to perform the detection mentioned before. The second network device 124, 164 may also be configured, if the first receiving message OM1 is error free and the second receiving message OM2 is indicated to be a duplicate of the first receiving message OM1, to discard the second receiving message OM2. As a result, the second network device 124, 164 may just use the first receiving message OM1 to generate at least one another output message at the output interface 150 of the second network device 124, 164.

FIG. 10 schematically illustrates a flowchart of an example of a method for the network device 100, which comprises the first input interface 102, the first output interface 104, and the second output interface 106, wherein the network device 100 is configured to change from the first state, referred to as the time state, to the second state, referred to as the spatial state, and vice versa, and wherein the method comprising the steps:

a) Receiving the first input message IM1 via the first input interface 102;
b) Generating each of a first output message OM1 and a second output message OM2 based on the first input message IM1;
c) Changing the network device 100 from the time state to the spatial state, or vice versa;
d) Transmitting, if the network device 100 changed to the time state in step c), both, the first output message OM1 and the second output message OM2, offset in time either via the first output interface 104 or second output interface 106; and
e) Transmitting, if the network device 100 changed to the spatial state in step c), the first output message OM1 via the first output interface 104 and the second output message OM2 via the second output interface 106.

It should be noted that steps d) and e) may be alternative method steps.

With respect to the method, reference is made to the previous explanations, preferred features, technical effects and/or advantages in an analogous manner as explained for the network device 100, the further network device 124, 164 and/or the communication system 122.

Although the described exemplary embodiments disclosed herein focus on devices, systems, and methods for using same, the present disclosure is not necessarily limited to the example embodiments illustrate herein.

The devices, systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A network device comprising:
a first input interface,
a first output interface, and
a second output interface,
wherein the network device is configured to transition between a first state, in which the network device is configured to provide temporal communication redundancy, and a second state, in which the network device is configured to provide spatial communication redundancy,
wherein the network device is configured to generate each of a first output message and a second output message based on a first input message,
wherein the first output message represents the same content as the second output message,
wherein, in the first state, the network device is configured to transmit, both the first output message and the second output message via a selected one of the first output interface or the second output interface, with transmission of the first output message in the first state being offset in time with respect to transmission of the second output message in the first state, and
wherein, in the second state, the network device is configured to transmit the first output message via the first output interface and to transmit the second output message via the second output interface.

2. The network device of claim 1, wherein the network device is configured to receive the first input message via the first input interface.

3. The network device of claim 2, wherein the network device is configured to receive the first input message and another second input message via the first input interface, with receipt of the first input message being offset in time with respect to receipt of the second input message.

4. The network device of claim 3, wherein the network device is configured to detect whether the first input message is error free,
wherein the network device is configured to detect whether the second input message includes an indication that the second input message is a duplicate of the first input message,
wherein the network device is configured, in response to determining that the first input message is error free and that the second input message is indicated to be a duplicate of the first input message, to discard the second input message.

5. The network device of claim 4,
wherein the network device is configured to generate each of the first output message and the second output message based on the first input message only if both, the first input message is error free and the second input message is indicated to be a duplicate of the first input message,
wherein the network device is configured to generate each of the first output message and the second output message based on the second input message, if both, the first input message is erroneous and second input message is indicated to be a duplicate of the first input message.

6. The network device of claim 5, wherein the network device is configured to detect whether the second input message is error free, and wherein the network device is configured to generate each of the first output message and the second output message based on the second input message only if, in addition, the second input message is error free.

7. The network device of claim 3, wherein the first input message is received by the network device temporally prior to the second input message.

8. The network device of claim 3, wherein the first input message comprises a first identifier and the second input message comprises a second identifier, wherein the network device is configured to detect, based the first and second identifiers, whether the second identifier indicates the second input message to be a duplicate of the first input message.

9. The network device of claim 2, wherein the network device comprises a second input interface, and wherein the network device is configured to receive a second input message via the second input interface.

10. The network device of claim 9,
wherein the network device is configured to detect whether the first input message is error free,
wherein the network device is configured to detect whether the second input message includes an indication to be a duplicate of the first input message,
wherein the network device is configured, if the first input message is error free and the second input message is indicated to be a duplicate of the first input message, to discard the second input message.

11. The network device of claim 10,
wherein the network device is configured to generate each of the first output message and the second output message based on the first input message only if both, the first input message is error free and the second input message is indicated to be a duplicate of the first input message,
wherein the network device is configured to generate each of the first output message and the second output message based on the second input message, if both, the first input message is erroneous and second input message is indicated to be a duplicate of the first input message.

12. The network device of claim 11, wherein the network device is configured to detect whether the second input message is error free, and wherein the network device is configured to generate each of the first output message and the second output message based on the second input message only if, in addition, the second input message is error free.

13. The network device of claim 1,
wherein network device is configured to detect and/or determine a destination node for the input message,
wherein the network device is configured to analyze a communication network, that can be connected to the first output interface or to both, the first and second output interfaces, such that the communication network would extend from at least one output interface of the network device to the destination node,
wherein the network device is configured, if the communication network is connected to the at least one output interface, to detect whether a first communication path of the communication network extends from the first output interface to the destination node and whether a second communication path of the communication network extends from the second output interface to the destination node,
wherein the network device is configured to change to or remain in the second state, if both, the first and second communication paths are detected, and
wherein the network device is configured to change to or remain in the first state, if only one of the first and second communication paths is detected.

14. The network device of claim 13, wherein the network device is configured to detect or determine the first and second communication paths such that the first and second communication paths form parallel communication paths.

15. The network device of claim 13, wherein the network device is configured to detect and/or determine the first and second communication paths such that message transmission over the first and second communication paths can be performed using different communication protocols.

16. The network device of claim 1,
wherein network topology data is stored by the network device,
wherein the network topology data represents a plurality of communication paths of a communication network that can be connected to the first output interface or to both, the first and second output interfaces,
wherein the network device is configured to determine, based on a predefined destination node being connected to the communication network and the network topology data, whether a first communication path of the communication network extends from the first output interface to the destination node and whether a second communication path of the communication network extends from the second output interface to the destination node are provided by the communication network when being connected to the network device at the first output interface or to both, the first and second output interfaces,
wherein the network device is configured to change to or remain in the second state, if both, the first and second communication paths are determined to be provided when the communication network is connected to the network device, and
wherein the network device is configured to change to or remain in the first state, if only one of the first and second communication paths is determined to be provided when the communication network is connected to the network device.

17. The network device of claim 16, wherein the network device is configured to detect or determine the first and second communication paths such that the first and second communication paths form parallel communication paths.

18. The network device of claim 16, wherein the network device is configured to detect and/or determine the first and second communication paths such that message transmission over the first and second communication paths can be performed using different communication protocols.

19. A method for a network device comprising a first input interface, a first output interface, and a second output interface, wherein the network device is configured to change between a first state, in which the network device is configured to provide temporal communication redundancy, and a second state, in which the network device is configured to provide spatial communication redundancy, and wherein the method comprising the steps:
a) Receiving a first input message via the first input interface;
b) Generating each of a first output message and a second output message based on the first input message, wherein the first output message and the second output message each represent the same content as the first input message;
c) Changing the network device to a selected one of the first state or the second state;
d) Transmitting, via a selected one of the first output interface or the second output interface while in the first state, both the first output message and the second output message, with transmission of the first output message being offset in time with respect to transmission of the second output message; and
e) Transmitting, while in the second state, the first output message via the first output interface and the second output message via the second output interface.

* * * * *